(12) United States Patent
Nagakura (10) Patent No.: US 9,118,197 B2
(45) Date of Patent: Aug. 25, 2015

(54) CHARGING CONTROL SYSTEM (75) Inventor: Hayato Nagakura, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 444 days.

(21) Appl. No.: 13/702,708

(22) PCT Filed: Jun. 7, 2011

(86) PCT No.: PCT/JP2011/003210
§ 371 (c)(1),
(2), (4) Date: Dec. 7, 2012

(87) PCT Pub. No.: WO2011/155186
PCT Pub. Date: Dec. 15, 2011

(65) Prior Publication Data
US 2013/0076314 A1  Mar. 28, 2013

(30) Foreign Application Priority Data

Jun. 9, 2010 (JP) .................................. 2010-131975
Apr. 20, 2011 (JP) .................................. 2011-093944

(51) Int. Cl.
*H01M 10/46* (2006.01)
*H02J 7/00* (2006.01)
*H01M 10/44* (2006.01)
*H01M 10/48* (2006.01)

(52) U.S. Cl.
CPC ............. *H02J 7/0052* (2013.01); *H01M 10/44* (2013.01); *H01M 10/48* (2013.01); *H02J 7/0073* (2013.01)

(58) Field of Classification Search
CPC ........ H02J 7/007; H02J 7/0081; H02J 7/0083
USPC .................. 320/107, 128, 132, 134, 136, 162
See application file for complete search history.

(56) References Cited

U.S. PATENT DOCUMENTS

2004/0076872 A1* 4/2004 Kinoshita et al. ............... 429/61
2006/0087291 A1   4/2006 Yamauchi
(Continued)

FOREIGN PATENT DOCUMENTS

CN       1767309 A        5/2006
JP       10-104325 A      4/1998
(Continued)

OTHER PUBLICATIONS

Chinese Office Action Jun. 24, 2014, 6 pages.

*Primary Examiner* — Edward Tso
(74) *Attorney, Agent, or Firm* — Foley & Lardner LLP (57) ABSTRACT

A charging control system is configured to calculate an internal resistance line indicating a relation between a value of a charging current and a value of a voltage of a battery, which voltage occurs when the charging current has flown into the battery, to obtain a maximum inputtable value point $S_{MAX}$ corresponding to a maximum inputtable power/current and a currently-inputted value point $S_{INP}$ corresponding to a charging power/current currently inputted to the battery, these points existing on the calculated internal resistance line. The charging control system is also configured to calculate a point located between the maximum inputtable value point $S_{MAX}$ and the currently-inputted value point $S_{INP}$, as a target point $S_{TRG}$ corresponding to a target charging power/current point, and to set, based on the calculated target point $S_{TRG}$, a charging power/current for charging the battery.

7 Claims, 6 Drawing Sheets

(56) References Cited

U.S. PATENT DOCUMENTS

2007/0108945 A1    5/2007   Ohashi et al.
2009/0266631 A1*   10/2009   Kikuchi ........................ 320/132

FOREIGN PATENT DOCUMENTS

| | | |
|---|---|---|
| JP | 10-224905 A | 8/1998 |
| JP | 2007-143279 A | 6/2007 |

\* cited by examiner

CHARGING CONTROL SYSTEM

TECHNICAL FIELD

The present invention relates to a charging control system configured to control a charge power/current inputted into a battery.

BACKGROUND ART

When charging a battery, generally, during the initial phase of battery charging, a charging current value for battery charging is gradually increased. Thereafter, immediately when the charging current value has reached a predetermined threshold current, the supply amount of the charging current is set to a predetermined constant current for constant-current charging. One such battery charging technology has been disclosed in Patent document 1.

CITATION LIST

Patent Literature

Patent document 1: Japanese Patent Provisional Publication No. 2007-143279 (A), corresponding to United States Patent Application Publication No.: US 2007/0108945 A1

SUMMARY OF INVENTION

Technical Problem

However, in the previously-discussed prior-art battery charging technology, the battery-charging operation is constructed by two different charging phases, namely, one being a gradual-current-increase charging phase and the other being a constant-current charging phase. To achieve the two different charging phases, the charging control system requires two sorts of charging-current control actions suited to the respective charging phases, in other words, a plurality of control maps, used to determine a charging current based on a charging rate, a battery voltage, and the like. Thus, this system suffers the disadvantage of an increased operation load on arithmetic processing. Also, in the previously-discussed prior-art battery charging technology, the control maps, used to determine a charging current, are usually preset or preprogrammed, fully taking account of a so-called "battery cycle deterioration", resulting from charging/discharging cycles of the battery being repeatedly charged and discharged. Thus, in the case of a new battery of a less deterioration rate, there is a problem that a charging current value is unnecessarily limited. Conversely, in the case of a considerably deteriorated battery due to "battery cycle deterioration", there is a problem of overcharging of the battery.

Solution to Problem

It is, therefore, in view of the previously-described disadvantages of the prior art, an object of the invention to provide a charging control system configured to enable a battery to be appropriately charged, while reducing an operation load on arithmetic processing executed within the charging control system.

In order to accomplish the aforementioned and other objects of the invention, a charging control system is configured to calculate an internal resistance line indicating a relation between a value of a charging current for charging a battery and a value of a voltage of the battery, which voltage occurs when the charging current has flown into the battery, to obtain a maximum inputtable power/current point corresponding to a maximum inputtable electric power/current, and a currently-inputted charging power/current point corresponding to a charging power/current currently inputted into the battery, these points existing on the calculated internal resistance line, to calculate a point existing on the calculated internal resistance line and located between the currently-inputted charging power/current point and the maximum inputtable power/current point as a target power/current point, and to set, based on the calculated target power/current point, a charging power/current for charging the battery.

Advantageous Effects of Invention

Therefore, according to the charging control system of the present invention, first, an internal resistance line, indicating a relation between a value of a charging current for charging a battery and a value of a voltage of the battery, which voltage occurs when the charging current has flown into the battery, is calculated. Next, a point existing on the calculated internal resistance line and located between a charging power/current point and a maximum inputtable power/current point is calculated as a target power/current point. Then, a charging power/current, needed to charge the battery, is set based on the calculated target power/current point. This eliminates the necessity of a plurality of control maps, used to determine a charging power/current. Thus, it is possible to reduce an operation load on arithmetic processing during execution of battery-charging operation. Additionally, according to the charging control system of the invention, in setting or determining a charging power/current, needed to charge the battery, it is possible to appropriately set the charging power/current, while taking a detection error of the battery condition (e.g., a voltage of the battery, an internal resistance of the battery, and so on) into account. Hence, in the case of a new battery of a less deterioration rate, it is possible to suppress a charging current value from being unnecessarily limited. Also, in the case of a considerably deteriorated battery, it is possible to effectively prevent the battery from being subjected to overcharging.

DESCRIPTION OF EMBODIMENTS

The charging control system of the present invention is hereunder explained in detail in reference to the drawings.

Figure 1:
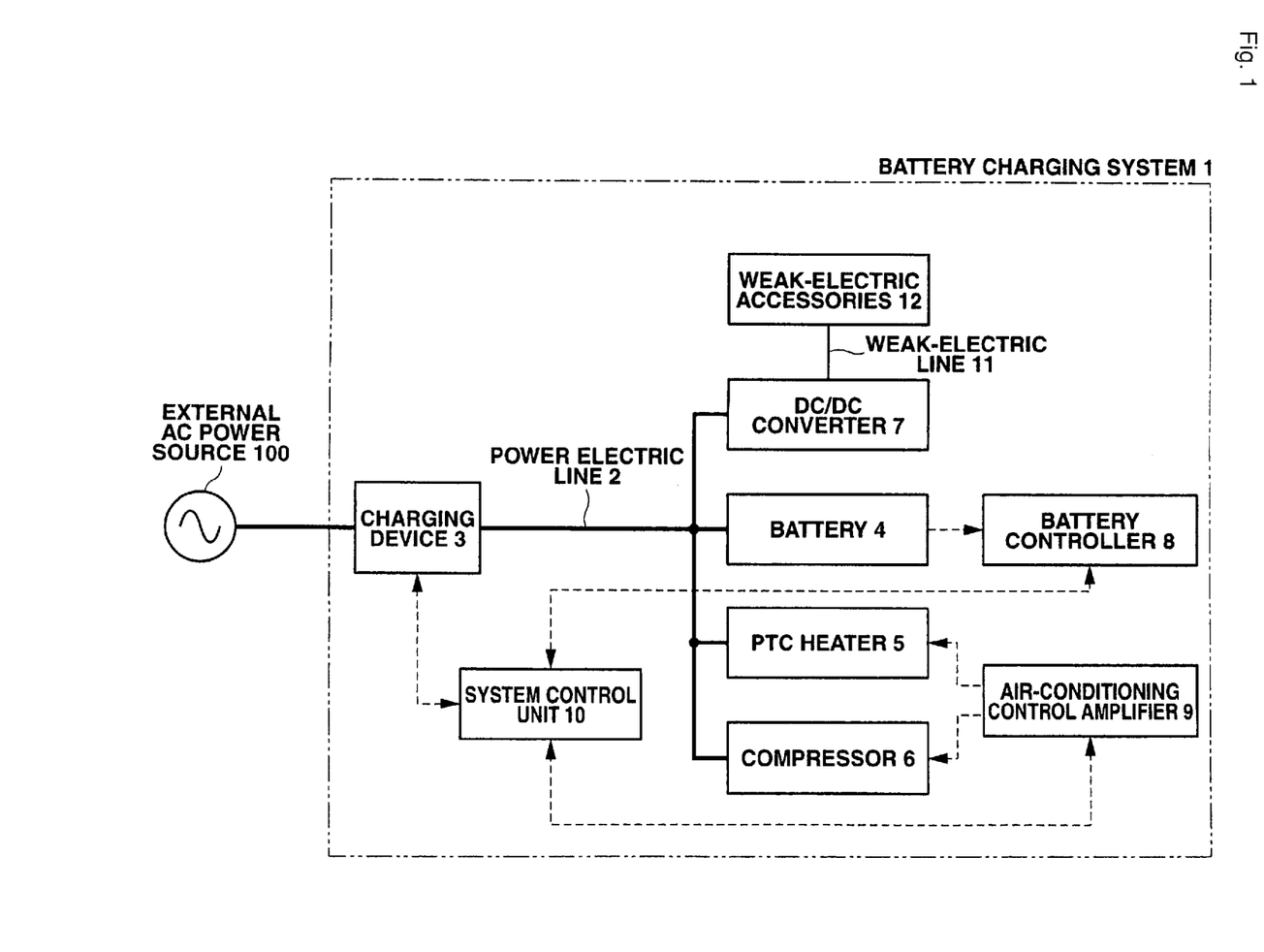
FIG. 1 is a block diagram illustrating a battery charging system according to an embodiment.

FIG. 1 is the block diagram illustrating the battery charging system according to the embodiment. The battery charging system of the embodiment is exemplified in an electrically-driven automotive vehicle, such as a hybrid electric vehicle or an electric vehicle.

As shown in FIG. 1, the battery charging system 1 of the embodiment employs a charging device 3, a battery 4, a PTC (positive temperature coefficient) ceramic heater (simply, PTC heater) 5, a compressor 6, and a DC/DC (direct-current to direct-current) converter 7, connected to each other through a power electric line (a high electric current line) 2. Battery charging system 1 is also configured to be electrically connectable to an external alternating current (AC) power source 100 through the power electric line 2. In order to charge the battery 4, external AC power source 100 is normally connected to the battery charging system 1 through the power electric line 2.

Battery 4 is an assembled battery constructed by connecting a plurality of battery cells, such as lithium-ion secondary battery cells, in series. As clearly shown in FIG. 1, a battery controller 8 is connected to battery 4 for monitoring each of the battery cells, constructing battery 4.

Battery controller 8 is configured to periodically monitor or detect a cell voltage $V_{Cell}$ of each of the battery cells, constructing battery 4, a total voltage $V_{BAT}$ of battery 4, a charging current $I_{CHG}$ of battery 4, and a temperature T of battery 4. Battery controller 8 is also configured to calculate, based on these detected informational data, a highest-voltage-cell voltage $V_h$, a cell internal resistance $R_{Cell}$ of each of the battery cells, constructing battery 4, a total internal resistance $R_{BAT}$ of battery 4, a charging upper-limit voltage $V_{LIM}$, and an open-circuit voltage $V_o$ of battery 4.

The highest-voltage-cell voltage $V_h$ is a terminal voltage of the highest terminal-voltage cell of the battery cells, constructing battery 4. The highest-voltage-cell voltage $V_h$ is calculated and determined based on the detected cell voltages $V_{Cell}$ of the battery cells.

Cell internal resistance $R_{Cell}$ is an internal resistance of each of the battery cells, constructing battery 4. Cell internal resistance $R_{Cell}$ is calculated based on the cell voltage $V_{Cell}$, the charging current $I_{CHG}$, a battery deterioration rate, and the like, for each and every battery cell. Total internal resistance $R_{BAT}$ is a total electric resistance of battery 4. Total internal resistance $R_{BAT}$ is a sum total of electric resistances of all battery component parts (including electric resistances of busbars through which the battery cells, constructing battery 4, are electrically connected to each other, as well as electric resistances of the battery cells, constructing battery 4. For instance, total internal resistance $R_{BAT}$ is calculated based on the total voltage $V_{BAT}$ of battery 4, the charging current $I_{CHG}$ of battery 4, and the battery deterioration rate.

Charging upper-limit voltage $V_{LIM}$ is an upper-limit voltage when charging the battery 4, that is to say, an upper-limit voltage, which is set to prevent a deterioration of battery 4. For instance, charging upper-limit voltage $V_{LIM}$ is calculated based on the total voltage $V_{BAT}$ of battery 4, the charging current $I_{CHG}$ of battery 4, the temperature T of battery 4, and the total internal resistance $R_{BAT}$ of battery 4. A voltage (hereinafter referred to as "lithium-deposition beginning voltage") that lithium deposition begins to occur inside of all battery cells, constructing battery 4, or inside of some battery cells, constructing battery 4, or a given voltage lower than the "lithium-deposition beginning voltage" by a given voltage value can be set as a charging upper-limit voltage $V_{LIM}$. However, the charging upper-limit voltage $V_{LIM}$ is not limited to such a "lithium-deposition beginning voltage" or such a given voltage lower than the "lithium-deposition beginning voltage". In the shown embodiment, suppose that charging upper-limit voltage $V_{LIM}$ is set to the "lithium-deposition beginning voltage" or the given voltage lower than the "lithium-deposition beginning voltage". In such a case, the charging upper-limit voltage $V_{LIM}$ has the following characteristics. That is, the higher the charging current $I_{CHG}$ of battery 4, the lower the charging upper-limit voltage $V_{LIM}$ can be calculated. Conversely, the lower the charging current $I_{CHG}$ of battery 4, the higher the charging upper-limit voltage $V_{LIM}$ can be calculated. Also, the higher the temperature T of battery 4, the higher the charging upper-limit voltage $V_{LIM}$ can be calculated. Conversely, the lower the temperature T of battery 4, the lower the charging upper-limit voltage $V_{LIM}$ can be calculated. Furthermore, the higher the total internal resistance $R_{BAT}$ of battery 4, the lower the charging upper-limit voltage $V_{LIM}$ can be calculated. Conversely, the lower the total internal resistance $R_{BAT}$ of battery 4, the higher the charging upper-limit voltage $V_{LIM}$ can be calculated.

Open-circuit voltage $V_o$ can be determined based on the total voltage $V_{BAT}$ of battery 4, which battery is in a no-load condition, and the charging current $I_{CHG}$. For instance, the open-circuit voltage $V_o$ is calculated by adding a voltage variation (a voltage increment/decrement), calculated based on the integrated current value of charging current $I_{CHG}$, to the total voltage of battery 4 in a no-load condition.

Battery controller 8 is further configured to send information about cell voltage $V_{Cell}$, total voltage $V_{BAT}$, charging current $I_{CHG}$, battery temperature T, highest-voltage-cell voltage $V_h$, cell internal resistance $R_{Cell}$, total internal resistance $R_{BAT}$, charging upper-limit voltage $V_{LIM}$, and open-circuit voltage $V_o$, to a system control unit 10.

PTC heater 5 is a heater driven by an electric power supplied from battery 4 or external AC power source 100 through the power electric line 2 thereto, for heating conditioned air which air is delivered into a vehicle compartment of the automotive vehicle on which battery charging system 1 is installed. The PTC heater 5 has a so-called PTC characteristic that a value of an electric resistance increases in accordance with a temperature rise in its heating element, thereby reducing electric power consumption.

Compressor 6 is a refrigerant compressor used to compress the refrigerant of a refrigeration cycle of an air conditioner (not shown) employed in the automotive vehicle, on which battery charging system 1 is installed. The air-conditioner compressor is driven by an electric power supplied from battery 4 or external AC power source 100 through the power electric line 2 thereto.

An air-conditioning control amplifier 9 is a control unit provided for controlling the operation of PTC heater 5 and the operation of air-conditioner compressor 6. Air-conditioning control amplifier 9 is configured to receive information about a vehicle-compartment interior temperature, detected by a temperature sensor (not shown), and a target temperature of conditioned air discharged into the vehicle compartment, to set or determine, based on the input information, a driving electric power needed to drive both the PTC heater 5 and the compressor 6, and to send a driving-power-supply command, corresponding to the set driving electric power, to the system control unit 10.

DC/DC converter 7 is a device configured to convert an electric power (one direct-current voltage) supplied from battery 4 through the power electric line 2 into another. The electric power, converted by means of DC/DC converter 7, is supplied through a weak electric line (a light electric current line) 11 to weak-electric accessories 12.

Charging device 3 is configured to ac-to-dc-convert an electric power from external AC power source 100 based on a power-supply command from system control unit 10, and to supply the ac-to-dc-converted electric power to each of battery 4, PTC heater 5, and compressor 6. By the way, regarding an installation of charging device 3, charging device 3 may be installed in the vehicle compartment or mounted on the vehicle outside of the vehicle compartment. Charging device 3 is also configured to obtain information about a suppliable electric power $P_{LIM}$ of external AC power source 100 by intercommunication with external AC power source 100, and to send the obtained information about suppliable electric power $P_{LIM}$ of external AC power source 100 to system control unit 10.

System control unit 10 is a control unit provided for controlling battery charging system 1 by intercommunication with each of battery controller 8, air-conditioning control amplifier 9, and charging device 3. In the shown embodiment, system control unit 10 is configured to receive input information from battery controller 8, that is, cell voltage $V_{Cell}$, total voltage $V_{BAT}$, charging current $I_{CHG}$, battery temperature T, highest-voltage-cell voltage $V_h$, cell internal resistance $R_{Cell}$, total internal resistance $R_{BAT}$, charging upper-limit voltage $V_{LIM}$, and open-circuit voltage $V_o$, to calculate, based on the input information, a target charging power $P_{TRG}$, and to send a power-supply command, corresponding to the calculated target charging power $P_{TRG}$ to charging device 3. Charging device 3 is responsive to the power-supply command from system control unit 10, so as to supply an electric power, ac-to-dc-converted based on the command, from external AC power source 100 to battery 4.

By the way, regarding an installation of system control unit 10, system control unit 10 may be installed in the vehicle compartment or mounted on the vehicle outside of the vehicle compartment.

Figure 2:
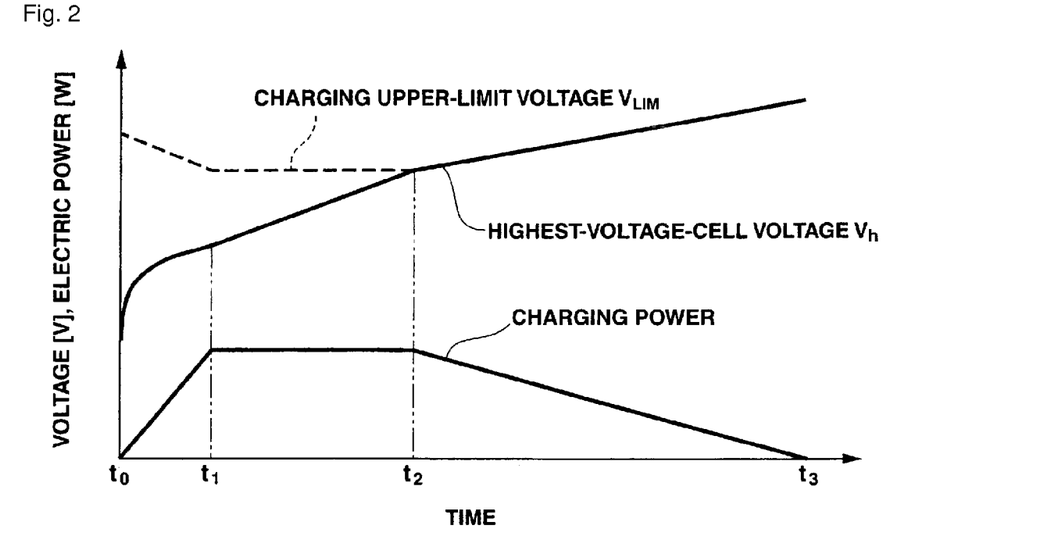
FIG. 2 is a charging profile obtained when a battery has been charged by the use of a target charging power $P_{TRG}$ calculated within the charging control system of the embodiment.

A method to calculate target charging power $P_{TRG}$, which corresponds to a charging power needed to charge the battery 4, is hereunder explained. The arithmetic processing is executed within system control unit 10. Hereupon, FIG. 2 is a charging profile obtained when battery 4 has been charged by the use of target charging power $P_{TRG}$ calculated by the system of the embodiment. FIGS. 3-6 are diagrams illustrating the method to calculate target charging power $P_{TRG}$ used to charge the battery 4 during the time period $t_0$-$t_1$ (see FIG. 2) from the time $t_0$ to the time $t_1$. The arithmetic processing for target charging power $P_{TRG}$ is executed within system control unit 10 as time-triggered interrupt routines to be triggered every predetermined time intervals.

First, a method to calculate a charging power during the initial phase of charging operation, that is, during the time period $t_0$-$t_1$ (see FIG. 2) from the time $t_0$ to the time $t_1$, is hereinafter explained. The time $t_0$ corresponds to a battery-charge starting point at which a charging power supply from external AC power source 100 to battery 4 starts.

First of all, system control unit 10 calculates an inputtable current $I_{MAX}$, which is an electric current that can be inputted into battery 4, based on the input information from battery controller 8, that is, highest-voltage-cell voltage $V_h$, cell internal resistance $R_{Cell}$, charging current $I_{CHG}$, and charging upper-limit voltage $V_{LIM}$. As described previously, the highest-voltage-cell voltage $V_h$ is a terminal voltage of the highest terminal-voltage cell of the battery cells, constructing battery 4.

Figure 3:
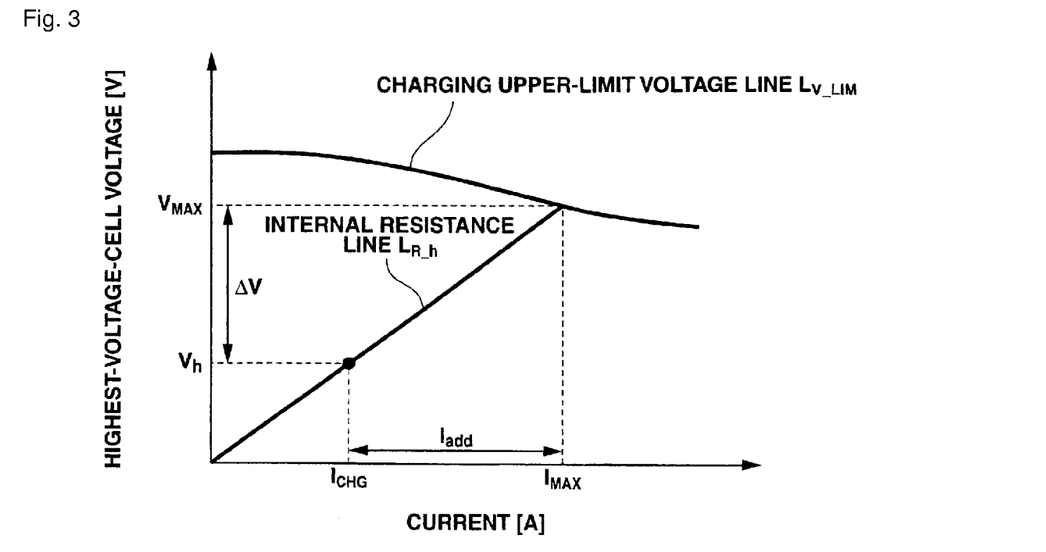
FIG. 3 is a diagram illustrating a method to calculate an inputtable current $I_{MAX}$ during the time period from the time $t_0$ to the time $t_1$.

The method to calculate inputtable current $I_{MAX}$ is hereunder described in detail in reference to the diagram of FIG. 3. In the arithmetic processing for inputtable current $I_{MAX}$, first of all, system control unit 10 calculates an internal resistance $R_h$ of the highest-voltage cell having the highest terminal voltage of the cells, constructing battery 4, based on the input information (concretely, cell internal resistances $R_{Cell}$ of the battery cells) from battery controller 8. Then, as shown in FIG. 3, system control unit 10 calculates, based on the calculated highest-voltage-cell internal resistance $R_h$, a highest-voltage-cell internal resistance line $L_{R\_h}$. Hereupon, the highest-voltage-cell internal resistance line $L_{R\_h}$ is a straight line indicating the relation between a charging current flown into the battery 4 (the highest-voltage cell) and a voltage (a terminal voltage) of the highest-voltage cell. That is, the highest-voltage-cell internal resistance line $L_{R\_h}$ is a straight line indicating the relation between a value of a certain charging current for charging the battery and a value of a voltage of the battery, which voltage occurs when the certain charging current has flown into the battery 4. More concretely, the highest-voltage-cell internal resistance line $L_{R\_h}$ can be calculated by the use of the highest-voltage-cell internal resistance $R_h$ calculated as discussed above and the open-circuit voltage $V_o$ inputted from battery controller 8. In lieu thereof, the highest-voltage-cell internal resistance line $L_{R\_h}$ may be calculated based on the highest-voltage-cell internal resistance $R_h$ calculated as discussed above and latest up-to-date information about the highest-voltage-cell voltage $V_h$ and charging current $I_{CHG}$ of battery 4. Furthermore, the highest-voltage-cell internal resistance line $L_{R\_h}$ can be calculated, based on the highest-voltage-cell voltage $V_h$ and charging current $I_{CHG}$, by performing linear regression of the relation between two variables, namely, the highest-voltage-cell voltage $V_h$ and charging current $I_{CHG}$.

Then, as shown in FIG. 3, system control unit 10 calculates, based on charging upper-limit voltage $V_{LIM}$ inputted from battery controller 8, a charging upper-limit voltage line $L_{V\_LIM}$. Concretely, system control unit 10 derives, based on charging upper-limit voltage $V_{LIM}$ inputted from battery controller 8, a variation of charging upper-limit voltage $V_{LIM}$ when the charging current of battery 4 is varying. On the basis of the derived voltage variation of charging upper-limit voltage $V_{LIM}$, charging upper-limit voltage line $L_{V\_LIM}$ is calculated. In lieu thereof, system control unit 10 may be configured to calculate charging upper-limit voltage line $L_{V\_LIM}$ from a preprogrammed look-up table showing the relation between charging upper-limit voltage $V_{LIM}$ and a charging current of battery 4.

Then, system control unit 10 determines or derives an intersection point of the calculated highest-voltage-cell internal resistance line $L_{R\_h}$ and the calculated charging upper-limit voltage line $L_{V\_LIM}$. The voltage on the calculated charging upper-limit voltage line $F_{V\_LIM}$, corresponding to the derived intersection point, is calculated as a maximum permissible voltage $V_{MAX}$. A voltage difference $\Delta V$ ($=V_{MAX}-V_h$) is arithmetically calculated by calculating the difference between the calculated maximum permissible voltage $V_{MAX}$ and the highest-voltage-cell voltage $V_h$. Then, system control unit 10 arithmetically calculates an addable current $I_{add}$ (=$\Delta V/R_h$) by dividing the calculated voltage difference $\Delta V$ by the highest-voltage-cell internal resistance $R_h$. Then, system control unit 10 arithmetically calculates inputtable current $I_{MAX}$ (=$I_{CHG}+I_{add}$) by adding the calculated addable current $I_{add}$ to the charging current In lieu thereof, system control unit 10 determines or derives an intersection point of the calculated highest-voltage-cell internal resistance line $L_{R\_h}$ and the calculated charging upper-limit voltage line $L_{V\_LIM}$ (see FIG. 3). The charging current, corresponding to the derived intersection point, may be calculated as an inputtable current $I_{MAX}$.

As discussed above, arithmetic calculation for inputtable current $I_{MAX}$ is performed by system control unit 10.

Then, system control unit 10 calculates a maximum inputtable power $P_{MAX}$, which is an electric power that can be inputted into the battery 4, by the use of the inputtable current $I_{MAX}$ calculated as discussed above. Concretely. system control unit 10 arithmetically calculates the maximum inputtable power $P_{MAX}$ (=$I_{MAX}^2 \times R_{BAT}$) by multiplying the inputtable current $I_{MAX}$ by a square of total internal resistance $R_{BAT}$ of battery 4. In lieu thereof, as can be appreciated from the diagram of FIG. 3, a voltage. corresponding to the inputtable current $I_{MAX}$, is calculated as a maximum permissible voltage $V_{MAX}$. The maximum inputtable power $P_{MAX}$ may be calculated or determined based on the inputtable current $I_{MAX}$. and the maximum permissible voltage $V_{MAX}$. As a concrete $P_{MAX}$ calculation method, the maximum inputtable power $P_{MAX}$ can be calculated by multiplying the inputtable current $I_{MAX}$, the maximum permissible voltage $V_{MAX}$, and the number of the cells. constructing battery 4, together.

Then, system control unit 10 calculates a total internal resistance line $L_R$ by the use of the total internal resistance $R_{BAT}$ inputted from battery controller 8. Thereafter, system control unit 10 calculates or derives an input power point $S_{INP}$, corresponding to the currently-inputted charging power $P_{INP}$ and existing on the calculated total internal resistance line $L_R$, and a maximum inputtable power point $S_{MAX}$, corresponding to the maximum inputtable power $P_{MAX}$ and existing on the calculated total internal resistance line $L_R$.

Figure 4:
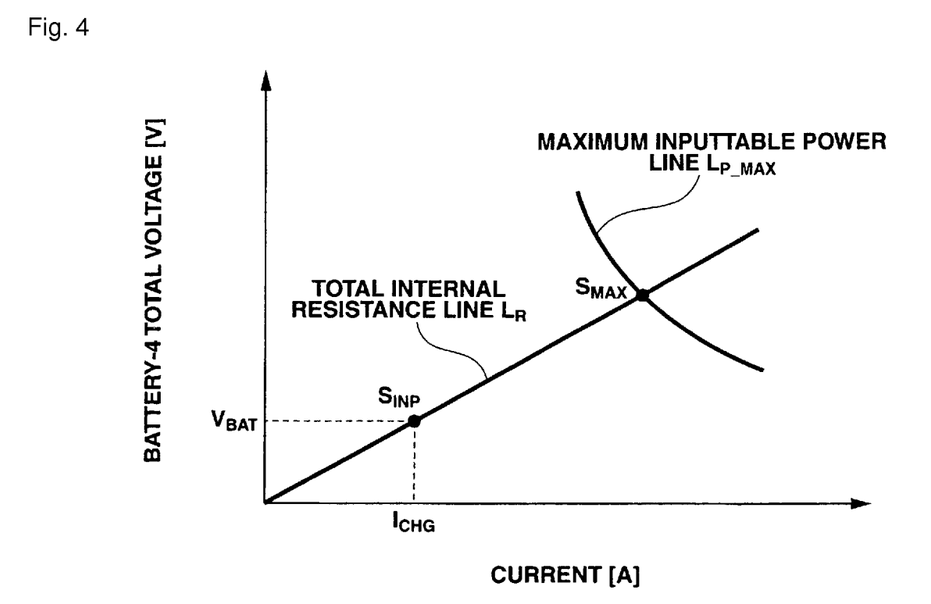
FIG. 4 is a diagram illustrating a method to calculate an input power point $S_{INP}$ and a maximum inputtable power point $S_{MAX}$ during the time period from the time $t_0$ to the time $t_1$.

The method to calculate input power point $S_{INP}$ and maximum inputtable power point $S_{MAX}$ is hereunder described in detail in reference to the diagram of FIG. 4.

In calculating input power point $S_{INP}$ and maximum inputtable power point $S_{MAX}$, as shown in FIG. 4, system control unit 10 calculates a total internal resistance line $L_R$. Hereupon, the total internal resistance line $L_R$ is a straight line indicating the relation between a charging current flown into the battery 4 and a total voltage of battery 4. That is, the total internal resistance line $L_R$ is a straight line indicating the relation between a value of a charging current for charging the battery and a value of a voltage of the battery, which voltage occurs when the charging current has flown into the battery 4. More concretely, the total internal resistance line $L_R$ can be calculated by the use of the total internal resistance $R_{BAT}$ of battery 4 and the open-circuit voltage $V_o$, both inputted from battery controller 8. In lieu thereof, the total internal resistance line $L_R$ may be calculated based on the total internal resistance $R_{BAT}$ of battery 4 inputted from battery controller 8 and latest up-to-date information about total voltage $V_{BAT}$ and charging current $I_{CHG}$ of battery 4. Furthermore, the total internal resistance line $L_R$ can be calculated, based on total voltage $V_{BAT}$ and charging current $I_{CHG}$ by performing linear regression of the relation between two variables, namely, total voltage $V_{BAT}$ and charging current $I_{CHG}$.

Then, system control unit 10 calculates an input power point $S_{INP}$, existing on the calculated total internal resistance line $L_R$ and corresponding to the currently-inputted charging power $P_{INP}$. Concretely, as shown in FIG. 4, system control unit 10 calculates input power point $S_{INP}$, based on latest up-to-date information from battery controller 8, that is, both the total voltage $V_{BAT}$ of battery currently applied to the battery 4 and the charging current $I_{CHG}$ currently inputted into the battery 4.

Then, system control unit 10 calculates a maximum inputtable power point $S_{MAX}$, existing on total internal resistance line $L_R$ and corresponding to maximum inputtable power $P_{MAX}$. Concretely, in calculating maximum inputtable power point $S_{MAX}$, first, system control unit 10 calculates a maximum inputtable power line $L_{P\_MAX}$ as shown in FIG. 4. Hereupon, the maximum inputtable power line $L_{P\_MAX}$ indicates the relation between a value of an electric current required when a charging power for charging the battery 4 is set to the maximum inputtable power $P_{MAX}$ and a value of a voltage of the battery, which voltage occurs when the required electric current has flown into the battery 4. The maximum inputtable power line $L_{P\_MAX}$ can be calculated based on the maximum inputtable power $P_{MAX}$ calculated as discussed previously. Then, as shown in FIG. 4, system control unit 10 determines or derives an intersection point of the calculated total internal resistance line $L_R$ and the calculated maximum inputtable power line $L_{P\_MAX}$. The power on the calculated maximum inputtable power line $L_{P\_MAX}$, corresponding to the derived intersection point, is calculated as a maximum inputtable power point $S_{MAX}$.

Figure 5:
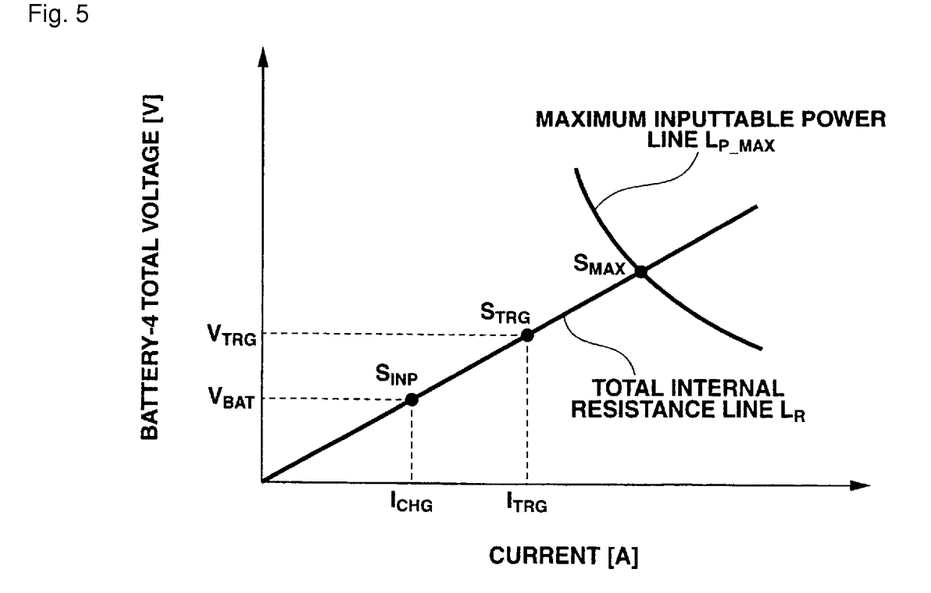
FIG. 5 is a diagram illustrating a method to calculate a target charging power $P_{TRG}$ during the time period from the time $t_0$ to the time $t_1$.

Subsequently to the above, system control unit 10 calculates a target charging power $P_{TRG}$ used to charge the battery 4. Hereupon, FIG. 5 is the diagram illustrating the method to calculate target charging power $P_{TRG}$ used to charge the battery 4. Concretely, as shown in FIG. 5, system control unit 10 calculates a point, existing on the calculated total internal resistance line $L_R$ and located between the calculated input power point $S_{INP}$ and the calculated maximum inputtable power point $S_{MAX}$, as a target charging power point $S_{TRG}$. Finally, system control unit 10 sets an electric power, corresponding to the target charging power point $S_{TRG}$, to a target charging power $P_{TRG}$.

In this manner, target charging power $P_{TRG}$ during the time period $t_0$-$t_1$ from the time $t_0$ to the time $t_1$ can be calculated.

Figure 6:
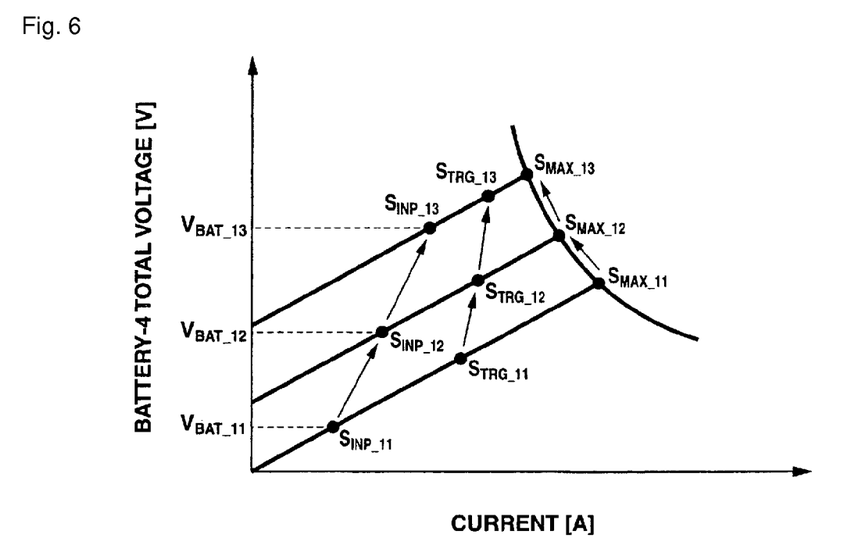
FIG. 6 is a further diagram illustrating a method to calculate a target charging power $P_{TRG}$ during the time period from the time $t_0$ to the time $t_1$.

For instance, as shown in FIG. 6, assume that, at an arbitrary point of time $t_{11}$ during time period $t_0$-$t_1$ (see FIG. 2) between the time $t_0$ and the time $t_1$, the input power point $S_{INP}$, the maximum inputtable power point $S_{MAX}$, and the target charging power point $S_{TRG}$, all calculated according to the previously-discussed calculation method, are set as an input power point $S_{INP\_11}$, a maximum inputtable power point $S_{MAX\_11}$, and a target charging power point $S_{TRG\_11}$, respectively. In this case, when charging operation of battery 4 is executed according to a certain target charging power $P_{TRG\_11}$, which is calculated based on the target charging power point $S_{TRG\_11}$ and to which the target charging power $P_{TRG}$ used to charge the battery 4 is set at the time $t_{11}$, total voltage $V_{BAT}$ of battery 4 rises from a voltage value $V_{BAT\_11}$ to a voltage value $V_{BAT\_12}$ at the time $t_{12}$ after a given time has elapsed from the time $t_{11}$.

Then, as shown in FIG. 6, an input power point $S_{INP\_12}$ and a maximum inputtable power point $S_{MAX\_12}$ at the time $t_{12}$ after the given time has elapsed from the time $t_{11}$, are calculated according to the previously-discussed calculation method. Then, a target charging power point $S_{TRG\_12}$ is calculated based on these calculated points $S_{INP\_12}$ and $S_{MAX\_12}$. As compared to the calculated target charging power point $S_{TRG\_11}$ at the time $t_{11}$, the calculated target charging power point $S_{TRG\_12}$ at the time $t_{12}$ can be brought closer to the maximum inputtable power point $S_{MAX\_12}$.

In a similar manner, when charging operation of battery 4 is executed according to a certain target charging power $P_{TRG\_12}$, which is calculated based on the target charging power point $S_{TRG\_12}$ and to which the target charging power $P_{TRG}$ used to charge the battery 4 is set at the time $t_{12}$, total voltage $V_{BAT}$ of battery 4 rises from a voltage value $V_{BAT\_12}$ to a voltage value $V_{BAT\_13}$ at the time $t_{13}$ after a given time has elapsed from the time $t_{12}$.

Then, as shown in FIG. 6, an input power point $S_{INP\_13}$ and a maximum inputtable power point $S_{MAX\_13}$ at the time $t_{13}$ after the given time has elapsed from the time $t_{12}$, are calculated according to the previously-discussed calculation method. Then, a target charging power point $S_{TRG\_13}$ is calculated based on these calculated points $S_{INP\_13}$ and $S_{MAX\_13}$. As compared to the calculated target charging power point $S_{TRG\_12}$ at the time $t_{12}$, the calculated target charging power point $S_{TRG\_13}$ at the time $t_{13}$ can be brought closer to the maximum inputtable power point $S_{MAX\_13}$.

In this manner, the system of the embodiment is configured to calculate target charging power $P_{TRG}$ according to the previously-discussed calculation method, and to supply a charging power, determined based on the calculated target charging power $P_{TRG}$ from external AC power source 100 to battery 4, thereby enabling the charging power to be brought gradually closer to the maximum inputtable power $P_{MAX}$. Hence, as seen from the characteristic of the charging power during the time period $t_0$-$t_1$ from the time $t_0$ to the time $t_1$ in FIG. 2, a charging power can be gradually increased during the initial phase of battery-charging operation.

In the diagram of FIG. 5, as an example, target charging power point $S_{TRG}$ is set to a midpoint between the input power point $S_{INP}$ and the maximum inputtable power point $S_{MAX}$. It will be understood that setting of target charging power point $S_{TRG}$ is not limited to such a midpoint between the two power points $S_{INP}$ and $S_{MAX}$. In lieu thereof, target charging power point $S_{TRG}$ can be set to an arbitrary point located between the input power point $S_{INP}$ and the maximum inputtable power point $S_{MAX}$. For instance, on the one hand, by setting the target charging power point $S_{TRG}$ to a position (a point on the total internal resistance line $L_R$) nearer the input power point $S_{INP}$ rather than the maximum inputtable power point $S_{MAX}$, it is possible to absorb various errors, namely, errors of calculations for cell internal resistance $R_{Cell}$ and total internal resistance $R_{BAT}$, performed by battery controller 8, and an error of detection of total voltage $V_{BAT}$ of battery 4. On the other hand, by setting the target charging power point $S_{TRG}$ to a position (a point on the total internal resistance line $L_R$) nearer the maximum inputtable power point $S_{MAX}$ rather than the input power point $S_{INP}$, it is possible to shorten the charging time duration of battery 4.

Hence, in setting the target charging power point $S_{TRG}$, on the basis of the total voltage $V_{BAT}$ of battery 4, detected by battery controller 8, it is possible to set the target charging power point $S_{TRG}$ to a position (a point on the total internal resistance line $L_R$) nearer the maximum inputtable power point $S_{MAX}$, as the total voltage $V_{BAT}$ of battery 4 becomes lower. Also, it is possible to set the target charging power point $S_{TRG}$ to a position (a point on the total internal resistance line $L_R$) nearer the input power point $S_{INP}$, conversely as the total voltage $V_{BAT}$ of battery 4 becomes higher.

As discussed above, by virtue of appropriate setting of target charging power point $S_{TRG}$ based on total voltage $V_{BAT}$ of battery 4, when total voltage $V_{BAT}$ of battery 4 is low, the voltage difference between cell voltage $V_{Cell}$ of each of the cells, constructing battery 4, and charging upper-limit voltage $V_{LIM}$ can become comparatively great. Thus, even when charging operation of battery 4 is executed with a comparatively great charging power, a possibility that the cell voltage $V_{Cell}$ of each of the cells, constructing battery 4, exceeds the charging upper-limit voltage $V_{LIM}$ tends to become low. For the reasons discussed above, by setting the target charging power point $S_{TRG}$ to a position (a point on the total internal resistance line $L_R$) nearer the maximum inputtable power point $S_{MAX}$ when the total voltage $V_{BAT}$ of battery 4 is low, it is possible to shorten the charging time duration of battery 4. Conversely when total voltage $V_{BAT}$ of battery 4 is high, the voltage difference between cell voltage $V_{Cell}$ of each of the cells, constructing battery 4, and charging upper-limit voltage $V_{LIM}$ can become comparatively less. Thus, by setting the target charging power point $S_{TRG}$ to a position (a point on the total internal resistance line $L_R$) nearer the input power point $S_{INP}$ when the total voltage $V_{BAT}$ of battery 4 is high, it is possible to more appropriately prevent cell voltage $V_{Cell}$ of each of the cells, constructing battery 4, from exceeding the charging upper-limit voltage $V_{LIM}$.

Furthermore, in setting the target charging power point $S_{TRG}$, on the basis of the temperature T of battery 4, detected by battery controller 8, it is possible to set the target charging power point $S_{TRG}$ to a position (a point on the total internal resistance line $L_R$) nearer the input power point $S_{INP}$, as the temperature T of battery 4 becomes lower. Also, it is possible to set the target charging power point $S_{TRG}$ to a position (a point on the total internal resistance line $L_R$) nearer the maximum inputtable power point $S_{MAX}$, as the temperature T of battery 4 becomes higher.

Thus, by virtue of appropriate setting of target charging power point $S_{TRG}$ based on the temperature T of battery 4, in the presence of various errors, namely, errors of calculations for cell internal resistance $R_{Cell}$ and total internal resistance $R_{BAT}$, performed by battery controller 8, and an error of detection of total voltage $V_{BAT}$ of battery 4, and/or in a situation where there is a high possibility that the charging control system is affected by such calculation/detection errors, that is, when the battery temperature T is low, it is possible to certainly absorb these errors. In contrast, in a situation where there is a less possibility that the charging control system is affected by such calculation/detection errors, that is, when the battery temperature T is high, it is possible to shorten the charging time duration of battery 4, while effectively absorbing these errors.

Moreover, in setting the target charging power point $S_{TRG}$, on the basis of the total internal resistance $R_{BAT}$ of battery 4, detected by battery controller 8, it is possible to set the target charging power point $S_{TRG}$ to a position (a point on the total internal resistance line $L_R$) nearer the maximum inputtable power point $S_{MAX}$, as the total internal resistance $R_{BAT}$ of battery 4 becomes lower. Also, it is possible to set the target charging power point $S_{TRG}$ to a position (a point on the total internal resistance line $L_R$) nearer the input power point $S_{INP}$, as the total internal resistance $R_{BAT}$ of battery 4 becomes higher.

Thus, by virtue of appropriate setting of target charging power point $S_{TRG}$ based on the total internal resistance $R_{BAT}$ of battery 4, in the presence of various errors, namely, errors of calculations for cell internal resistance $R_{Cell}$ and total internal resistance $R_{BAT}$, performed by battery controller 8, and an error of detection of total voltage $V_{BAT}$ of battery 4, and/or in a situation where there is a high possibility that the charging control system is affected by such calculation/detection errors, that is, when the total internal resistance $R_{BAT}$ is high, it is possible to certainly absorb these errors. In contrast, in a situation where there is a less possibility that the charging control system is affected by such calculation/detection errors, that is, when the total internal resistance $R_{BAT}$ is low, it is possible to shorten the charging time duration of battery 4, while effectively absorbing these errors.

Owing to a gradual increase in charging power, immediately when target charging power $P_{TRG}$ for charging the battery 4 becomes identical to suppliable electric power $P_{LIM}$ of external AC power source 100 at the time $t_1$ of FIG. 2, charging operation of battery 4 is executed according to suppliable electric power $P_{LIM}$ of external AC power source 100. Even when executing battery-charging operation according to suppliable electric power $P_{LIM}$, system control unit 10 repeatedly executes arithmetic processing for target charging power $P_{TRG}$ every predetermined time intervals.

Thereafter, at the time $t_2$ of FIG. 2, the highest-voltage-cell voltage $V_h$ reaches the charging upper-limit voltage $V_{LIM}$. A method to calculate target charging power $P_{TRG}$, corresponding to a charging power for charging the battery 4 during the time period $t_2$-$t_3$ (see FIG. 2) from the time $t_2$ to the time $t_3$, that is, after the highest-voltage-cell voltage $V_h$ has reached the charging upper-limit voltage $V_{LIM}$, is hereinafter explained.

During the time period $t_2$-$t_3$ shown in FIG. 2, in a similar manner to the above, first of all, system control unit 10 calculates inputtable current $I_{MAX}$, and then calculates input power point $S_{INP}$ and maximum inputtable power point $S_{MAX}$. The method to calculate inputtable current $I_{MAX}$ during the time period $t_2$-$t_3$ is hereunder described in detail in reference to the diagram of FIG. 7.

Figure 7:
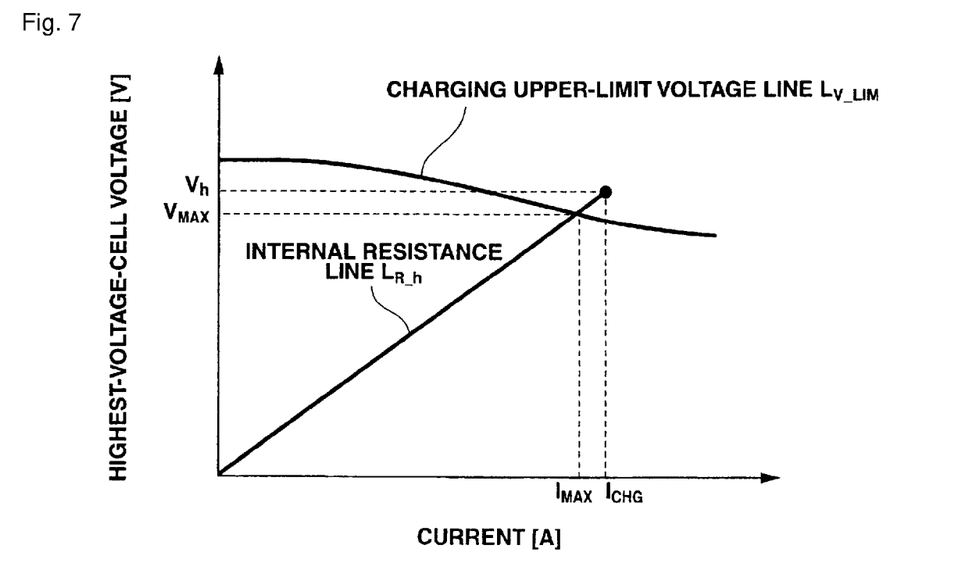
FIG. 7 is a diagram illustrating a method to calculate an inputtable current $I_{MAX}$ during the time period from the time $t_2$ to the time $t_3$.

As seen from the diagrams of FIGS. 2 and 7, during the time period $t_2$-$t_3$ from the time $t_2$ to the time $t_3$, the highest-voltage-cell voltage $V_h$ has reached the charging upper-limit voltage $V_{LIM}$ (the time $t_2$ of FIG. 2), and then exceeded the charging upper-limit voltage $V_{LIM}$ (after the time $t_2$ of FIG. 2). As a result, the currently-applied charging current $I_{CHG}$ becomes higher than the inputtable current $I_{MAX}$, and the currently-applied highest-voltage-cell voltage $V_h$ becomes higher than the maximum permissible voltage $V_{MAX}$ (see FIG. 7).

Figure 8:
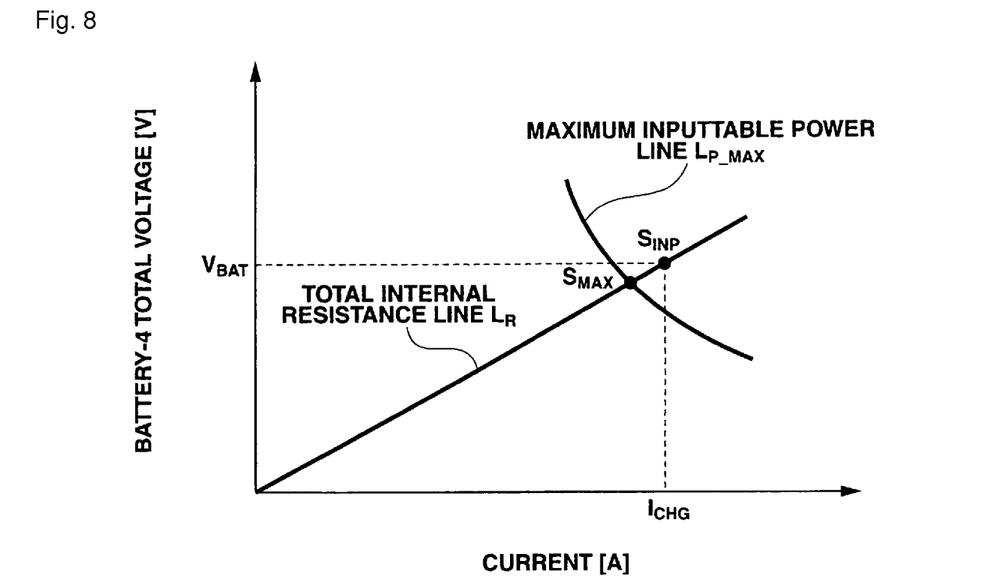
FIG. 8 is a diagram illustrating a method to calculate an input power point $S_{INP}$ and a maximum inputtable power point $S_{MAX}$ during the time period from the time $t_2$ to the time $t_3$.

For the reasons discussed above, during the time period $t_2$-$t_3$, as shown in FIG. 8, input power point $S_{INP}$ exceeds the maximum inputtable power point $S_{MAX}$ (see the upper-right position on the total internal resistance line $L_R$ in the diagram of FIG. 8). Thus, in contrast to the calculation method of target charging power $P_{TRG}$ during the time period $t_0$-$t_1$, in the case of the calculation method during the time period $t_2$-$t_3$, target charging power point $S_{TRG}$ is set to a position (an intersection point of the maximum inputtable power line $L_{P\_MAX}$ and the total internal resistance line $L_R$) identical to the maximum inputtable power point $S_{MAX}$. That is, during the time period $t_2 t_3$, target charging power $P_{TRG}$ is set to the maximum inputtable power $P_{MAX}$.

In this manner, target charging power $P_{TRG}$ during the time period $t_2$-$t_3$ from the time $t_2$ to the time $t_3$ can be calculated.

Figure 9:
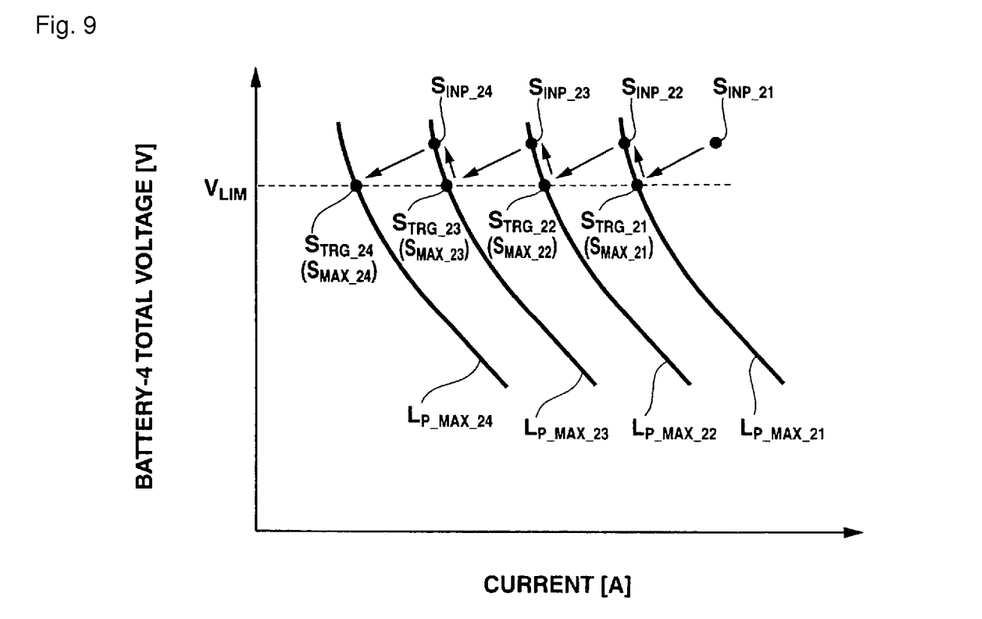
FIG. 9 is a diagram illustrating a method to calculate a target charging power $P_{TRG}$ during the time period from the time $t_2$ to the time $t_3$.

For instance, as shown in FIG. 9, assume that, at an arbitrary point of time $t_{21}$ during time period $t_2$-$t_3$ (see FIG. 2) between the time $t_2$ and the time $t_3$, the input power point $S_{INP}$, the maximum inputtable power line $L_{P\_MAX}$, the maximum inputtable power point $S_{MAX}$, and the target charging power point $S_{TRG}$, all calculated according to the previously-discussed calculation method, are set as an input power point $S_{INP\_21}$, a maximum inputtable power line $L_{P\_MAX\_21}$, a maximum inputtable power point $S_{MAX\_21}$, and a target charging power point $S_{TRG\_21}$, respectively. In this case, input power point $S_{INP\_21}$ exceeds the charging upper-limit voltage $V_{LIM}$, and thus target charging power point $S_{TRG\_21}$ becomes set to a position (a point on the maximum inputtable power line $L_{P\_MAX\_21}$) identical to the maximum inputtable power point $S_{MAX\_21}$. A target charging Power $P_{TRG\_21}$ is calculated based on the target charging power point $S_{TRG\_21}$, which is set to be identical to the maximum inputtable power point $S_{MAX\_21}$. That is, by setting the target charging power $P_{TRG\_21}$ to a value identical to the maximum inputtable power $P_{MAX\_21}$, the target charging power $P_{TRG\_21}$ can be set or calculated as a lower value than the currently-inputted charging power $P_{INP\_21}$.

In a similar manner to the point of time $t_{21}$, at the time $t_{22}$ after a given time has voltage $V_{LIM}$, and thus target charging power point $S_{TRG\_22}$ becomes set to a position (a point on the maximum inputtable power line $L_{P\_MAX\_22}$) identical to the maximum inputtable power point $S_{MAX\_22}$. A target charging power $P_{TRG\_22}$ is calculated based on the target charging power point $S_{TRG\_22}$, which is set to be identical to the maximum inputtable power point $S_{MAX\_22}$. That is, by setting the target charging power $P_{TRG\_22}$ to a value identical to the maximum inputtable power $P_{MAX\_22}$, the target charging power $P_{TRG\_22}$ can be set or calculated as a further lower value.

Then, at the time $t_{23}$ after a given time has elapsed from the time $t_{22}$, and then at the time $t_{24}$ after a given time has elapsed from the time $t_{23}$, in a similar manner to the above, target charging power $P_{TRG}$ is gradually decremented and set to a further lower value. By this, as can be seen from the diagram of FIG. 2 during the time period $t_2$-$t_3$, it is possible to gradually reduce a charging power supplied from external AC power source 100 to battery 4, while maintaining the highest-voltage-cell voltage $V_h$ at a value identical to the charging upper-limit voltage $V_{LIM}$, thus finally appropriately bring the battery 4 to a fully-charged state.

Figure 10:
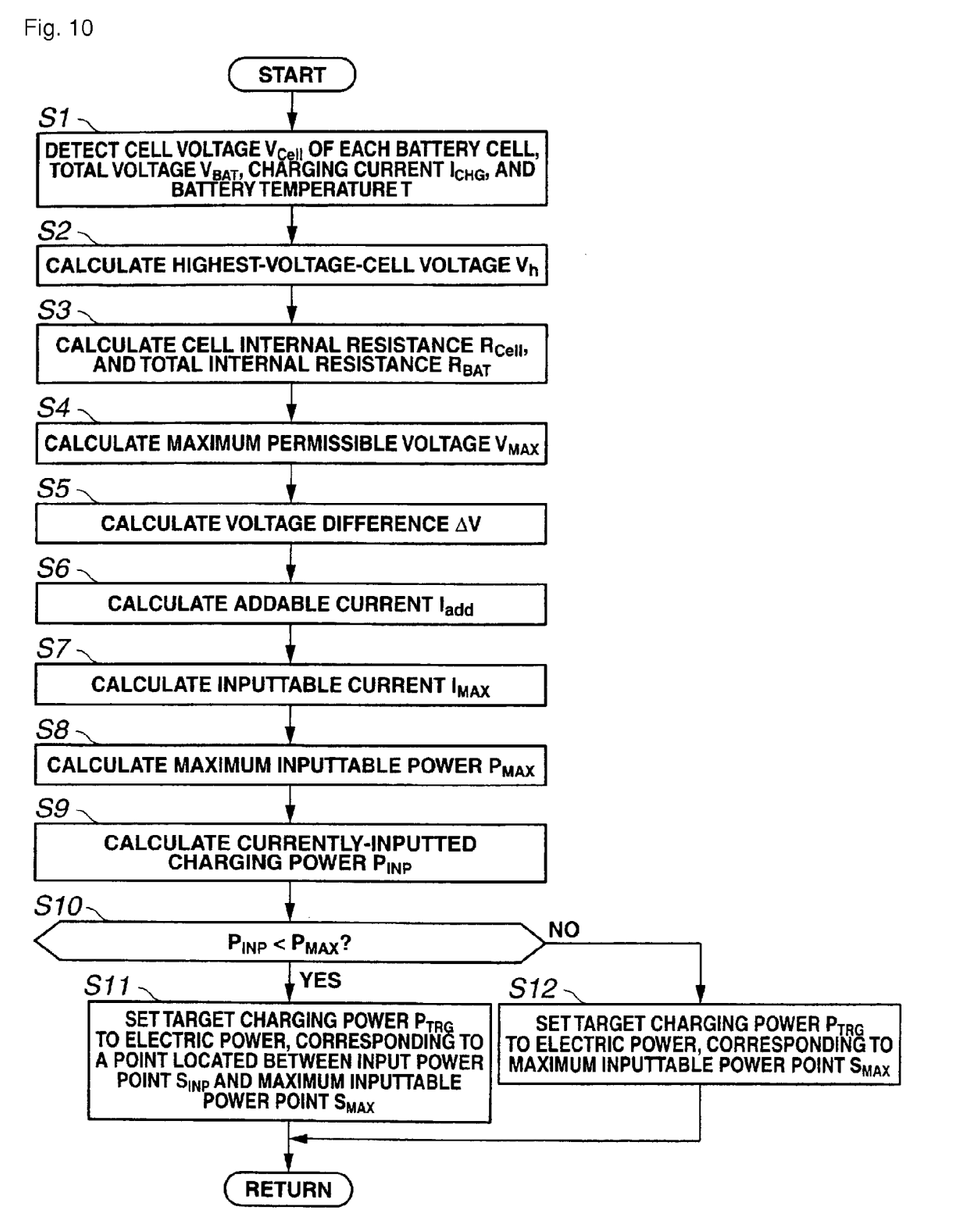
FIG. 10 is a flowchart illustrating charging control executed by the system of the embodiment.

The control flow of charging control executed within the system of embodiment is hereunder described in detail in reference to the flowchart of FIG. 10. The charging control routine is executed by means of system control unit 10 and battery controller 8 as time-triggered interrupt routines to be triggered every predetermined time intervals.

First of all, at step S1, cell voltage $V_{Cell}$ of each of the cells, constructing battery 4, total voltage $V_{BAT}$ of battery 4, charging current $I_{CHG}$ of battery 4, and temperature T of battery 4 are detected by battery controller 8. Then, information about these detected values is sent to system control unit 10.

At step S2, arithmetic processing for highest-voltage-cell voltage $V_h$ is carried out based on the cell voltages $V_{Cell}$ of all the battery cells, detected through step S1, by means of battery controller 8. Then, information about the calculated highest-voltage-cell voltage $V_h$ is sent to system control unit 10.

At step S3, arithmetic processing for cell internal resistance $R_{Cell}$ of each of the battery cells, and total internal resistance $R_{BAT}$ of battery 4 are carried out based on the information about cell voltage $V_{Cell}$ of each of the cells, total voltage $V_{BAT}$ of battery 4, charging current $I_{CHG}$ of battery 4, and temperature T of battery 4, which informational data are detected through step S1 by battery controller 8. Then, information about the calculated cell internal resistance $R_{Cell}$ and the calculated total internal resistance $R_{BAT}$ is sent to system control unit 10. At this time, as previously described, system control unit 10 calculates an internal resistance $R_h$ of the highest-voltage cell having the highest terminal voltage of the cells, constructing battery 4, based on the input information about battery cell internal resistances $R_{Cell}$ from battery controller 8.

At step S4, arithmetic processing for maximum permissible voltage $V_{MAX}$ is carried out by system control unit 10. Concretely, arithmetic processing for charging upper-limit voltage $V_{LIM}$ is carried out based on the charging current $I_{CHG}$ of battery 4 and the temperature T of battery 4, detected through step S1, by means of battery controller 8. Then, information about the calculated charging upper-limit voltage $V_{LIM}$ is sent to system control unit 10. Thereafter, system control unit 10 calculates, based on charging upper-limit voltage $V_{LIM}$ inputted from battery controller 8, a charging upper-limit voltage line $L_{V\_LIM}$ shown in FIG. 3. Then, as seen from the diagram of FIG. 3, system control unit 10 determines or derives an intersection point of the calculated highest-voltage-cell internal resistance line $L_{R\_h}$ and the calculated charging upper-limit voltage line $L_{V\_LIM}$. Then, system control unit 10 calculates the voltage on the calculated charging upper-limit voltage line $L_{V\_LIM}$, corresponding to the derived intersection point, as a maximum permissible voltage $V_{MAX}$. By the way, the highest-voltage-cell internal resistance line $L_{R\_h}$ can be calculated based on at least the highest-voltage-cell internal resistance $R_h$ as discussed previously (see the diagram of FIG. 3).

At step S5, arithmetic processing for voltage difference $\Delta V$ is carried out by system control unit 10. The voltage difference $\Delta V$ can be calculated as the difference between the calculated maximum permissible voltage $V_{MAX}$ and the highest-voltage-cell voltage $V_h$, that is, $\Delta V = V_{MAX} - V_h$, as seen from the diagram of FIG. 3.

At step S6, arithmetic processing for addable current $I_{add}$ is carried out by system control unit 10. The addable current $I_{add}$ is an electric current value that can be increased from the charging current $I_{CHG}$ up to the inputtable current $I_{MAX}$. Concretely, addable current $I_{add}$ is calculated, based on the voltage difference $\Delta V$ calculated through step S5 and the highest-voltage-cell internal resistance $R_h$ calculated through step S3, from the expression $I_{add} = \Delta V / R_h$.

Then, at step S7, arithmetic processing for inputtable current $I_{MAX}$ is carried out by system control unit 10. Concretely, inputtable current $I_{MAX}$ is calculated, based on the charging current $I_{CHG}$ detected through step S1 and the addable current $I_{add}$ calculated through step S6, from the expression $I_{MAX} = I_{CHG} + I_{add}$.

At step S8, arithmetic processing for maximum inputtable power $P_{MAX}$ is carried out by system control unit 10. Concretely, maximum inputtable power $P_{MAX}$ is calculated, based on the total internal resistance $R_{BAT}$ calculated through step S3 and the inputtable current $I_{MAX}$ calculated through step S7, from the expression $P_{MAX} (= (I_{MAX})^2 \times R_{BAT})$.

Then, at step S9, arithmetic processing for currently-inputted charging power $P_{INP}$ is carried out by system control unit 10. Concretely, currently-inputted charging power $P_{INP}$ is calculated, based on the charging current $I_{CHG}$ and the total voltage $V_{BAT}$ both detected through step S1, from the expression $P_{INP} = I_{CHG} \times V_{BAT}$.

Then, at step S10, a comparison between the maximum inputtable power $P_{MAX}$ calculated through step S8 and the currently-inputted charging power $P_{INP}$ calculated through step S9 is made. As a result of comparison, when the currently-inputted charging power $P_{INP}$ is less than the maximum inputtable power $P_{MAX}$, that is, $P_{INP} < P_{MAX}$, the routine proceeds to step S11. Conversely when the currently-inputted charging power $P_{INP}$ is greater than or equal to the maximum inputtable power $P_{MAX}$, that is, $P_{INP} \geq P_{MAX}$, the routine proceeds to step S12.

When the currently-inputted charging power $P_{INP}$ is less than the maximum inputtable power $P_{MAX}$ (i.e., $P_{INP} < P_{MAX}$), that is, in a situation shown in FIG. 2 during the time period $t_0$-$t_1$ (in other words, during the initial phase of battery-charging operation), the routine proceeds to step S11. At step S11, system control unit 10 calculates, according to the previously-discussed calculation method, a point located between the input power point $S_{INP}$ and the maximum inputtable power point $S_{MAX}$ as a target charging power point $S_{TRG}$, and then sets an electric power, corresponding to the calculated target charging power point $S_{TRG}$, to a target charging power $P_{TRG}$, (see FIGS. 4-5).

Conversely when the currently-inputted charging power $P_{INP}$ is greater than or equal to the maximum inputtable power $P_{MAX}$ (i.e. $P_{INP} \geq P_{MAX}$), that is, in a situation shown in FIG. 2 during the time period $t_1$-$t_3$ (in other words, during the middle and last phase of battery-charging operation), the routine proceeds to step S12. At step S12, system control unit 10 sets, according to the previously-discussed calculation method, an electric power, corresponding to the maximum inputtable power point $S_{MAX}$, to a target charging power $P_{TRG}$ (see FIG. 8).

In the shown embodiment, charging control of battery 4 is performed by repeated executions of a series of steps S1-S12 of FIG. 10. That is, according to the system of the embodiment, a condition of battery 4, that is, cell voltage $V_{Cell}$, total voltage $V_{BAT}$, charging current $I_{CHG}$, battery temperature T, cell internal resistance $R_{Cell}$, total internal resistance $R_{BAT}$ and the like, are sequentially detected, and then target charging power $P_{TRG}$ is set responsively to the detected condition of battery 4. In this manner, as seen from the diagram of FIG. 2, charging operation of battery 4 is performed.

In the system of the embodiment, as discussed above, total internal resistance line $L_R$ is calculated by the use of total internal resistance $R_{BAT}$. Then, input power point $S_{INP}$, corresponding to the currently-inputted charging power $P_{INP}$ and existing on the calculated total internal resistance line $L_R$, and maximum inputtable power point $S_{MAX}$, corresponding to the maximum inputtable power $P_{MAX}$ and existing on the calculated total internal resistance line $L_R$, are calculated. Then, a point, existing on the calculated total internal resistance line $L_R$ and located between the calculated input power point $S_{INP}$ and the calculated maximum inputtable power point $S_{MAX}$, is calculated as a target charging power point $S_{TRG}$. An electric power, corresponding to the calculated target charging power point $S_{TRG}$, is set to a target charging power $P_{TRG}$ for charging the battery 4. According to the system of the embodiment, in calculating the target charging power $P_{TRG}$ for charging the battery 4, by virtue of appropriate setting of an arbitrary point located between input power point $S_{INP}$ and maximum inputtable power point $S_{MAX}$, it is possible to absorb various errors, namely, errors of calculations for cell internal resistance $R_{Cell}$ and total internal resistance $R_{BAT}$, performed by battery controller 8, and an error of detection of total voltage $V_{BAT}$ of battery 4. As a result, when charging the battery 4, it is possible to effectively prevent the total voltage $V_{BAT}$ of battery 4 (or the cell voltage $V_{Cell}$ of each of the cells, constructing battery 4) from exceeding its predetermined upper-limit voltage. In particular, according to the shown embodiment, total internal resistance line $L_R$ is calculated responsively to latest up-to-date information about the condition of battery 4 (e.g., the total voltage $V_{BAT}$ of battery 4, and the total internal resistance $R_{BAT}$ of battery 4, and the like), every predetermined time intervals. Then, target charging power $P_{TRG}$ is set by the use of the calculated total internal resistance $L_R$ according to the previously-discussed calculation method. Hence, according to the system of the embodiment, in the case of a new battery of a less deterioration rate, it is possible to suppress a charging current value from being unnecessarily limited. In contrast, even in the case of a considerably deteriorated battery, it is possible to effectively prevent the battery from being subjected to overcharging.

Additionally, according to the system of the embodiment, regardless of a plurality of battery-charging phases (for instance, regardless of the initial charging phase during the time period $t_0$-$t_1$, the middle charging phase during the time period $t_1$-$t_2$, and the last charging phase during the time period $t_2$-$t_3$ in the diagram of FIG. 2), it is possible to set target charging power $P_{TRG}$ for charging the battery 4, by the same calculation method as discussed previously. This eliminates the necessity for presetting or preprogramming of a plurality of charging-control maps differing from each other depending on respective battery-charging phases, thus enables an operation load on arithmetic processing to be reduced.

Additionally, according to the system of the embodiment, a margin, needed to absorb various detection/calculation errors as described previously, is set, only when target charging power $P_{TRG}$ is finally calculated. This eliminates the necessity for setting margins, needed to absorb these detection/calculation errors, for every calculation/detection steps. Thus, it is possible to achieve charging control of battery 4 with a minimized operation load on arithmetic processing executed within the charging control system.

Furthermore, in the shown embodiment, in calculating maximum inputtable power point $P_{MAX}$, highest-voltage-cell voltage $V_h$ and highest-voltage-cell internal resistance $R_h$ are used. Hereby, as a matter of course, the voltage of each of the battery cells, constructing battery 4, is less than or equal to the highest-voltage-cell voltage $V_h$. For this reason, when calculating maximum inputtable power $P_{MAX}$, it is possible to calculate a maximum inputtable electric power suited to each of the battery cells containing the highest terminal-voltage cell by calculating the maximum inputtable power $P_{MAX}$ by the use of highest-voltage-cell voltage $V_h$ and highest-voltage-cell internal resistance $R_h$ of the highest terminal-voltage cell, serving as a reference. By virtue of appropriate setting of the maximum inputtable power, it is possible to more effectively prevent the total voltage $V_{BAT}$ of battery 4 (or the cell voltage $V_{Cell}$ of each of the cells, constructing battery 4) from exceeding its predetermined upper-limit voltage.

In the shown embodiment, battery controller 8 serves as voltage detection means, upper-limit voltage calculation means, internal resistance calculation means, and temperature detection means. System control unit 10 serves as maximum inputtable power calculation means (maximum inputtable value calculation means), internal resistance line calculation means, target power point calculation means (target point calculation means), and input power setting means (input value setting means).

While the foregoing is a description of the preferred embodiments carried out the invention, the previously-described particular embodiments are shown herein to increase their intelligibility and for best understanding. It will be understood that the invention is not limited to the particular embodiments shown and described herein, but that various changes and modifications may be made without departing from the scope or spirit of this invention.

The charging control system of the embodiment is exemplified in a system configuration that, when calculating maximum inputtable power $P_{MAX}$, highest-voltage-cell voltage $V_h$ and highest-voltage-cell internal resistance $R_h$ are used. Instead of using highest-voltage-cell voltage $V_h$ and highest-voltage-cell internal resistance $R_h$, the charging control system of the invention may be configured in a manner so as to calculate maximum inputtable power $P_{MAX}$ by the use of total voltage $V_{BAT}$ and total internal resistance $R_{BAT}$ of battery 4. In lieu thereof, the charging control system of the invention may be configured in a manner so as to calculate maximum inputtable power $P_{MAX}$ by the use of cell voltage $V_{Cell}$ and cell internal resistance $R_{Cell}$ of an arbitrary cell of the battery cells, constructing battery 4.

Also, in the shown embodiment, the charging control system is exemplified in a system configuration that target charging power $P_{TRG}$ is calculated and then charging operation of battery 4 is executed according to the calculated target charging power $P_{TRG}$. Instead of using target charging power $P_{TRG}$, the charging control system of the invention may be configured in a manner so as to calculate a target charging current $I_{TRG}$ and to execute charging operation of battery 4 according to the calculated target charging current $I_{TRG}$.

Furthermore, in the shown embodiment, the charging control system is exemplified in a system configuration that charging operation of battery 4 is initiated from a battery condition where a state of charge, often abbreviated to "SOC" and given in percentage (%), is comparatively low. It will be appreciated that the invention is not limited to battery-charging control initiated from such a low "SOC". The charging control system of the embodiment can be applied to a battery whose charging operation is initiated from a battery condition where the battery has a comparatively high "SOC" or the battery is approximately fully charged. Also in such a case that charging operation of battery 4 is initiated from either a battery condition of a comparatively high "SOC" or an approximately fully-charged condition, in the same manner as the previously-described charging control, first, target charging power $P_{TRG}$ is set according to the calculation method during the time period $t_0$-$t_1$ in FIG. 2 (i.e., during the initial phase of battery-charging operation), and secondly target charging power $P_{TRG}$ is fixed to suppliable electric power $P_{LIM}$ of external AC power source 100 according to the calculation method during the time period $t_1$-$t_2$ in FIG. 2 (i.e., during the middle phase of battery-charging operation), and thirdly target charging power $P_{TRG}$ is set according to the calculation method during the time period $t_2$-$t_3$ in FIG. 2 (i.e., during the last phase of battery-charging operation), that is, after highest-voltage-cell voltage $V_h$ has reached charging upper-limit voltage $V_{LIM}$.

The invention claimed is:

1. A charging control system for controlling a charging power or a charging current for charging a battery, comprising:
    a voltage detector configured to detect a voltage of the battery;
    an upper-limit voltage calculating section configured to calculate an upper-limit voltage of the battery;
    an internal resistance line calculating section configured to calculate an internal resistance line indicating a relation between a value of a charging current and a value of a voltage of the battery, which voltage occurs when the charging current has flown into the battery;
    a maximum inputtable value calculating section configured to calculate, based on the detected voltage of the battery, the calculated upper-limit voltage of the battery, and the calculated internal resistance line, a maximum inputtable value corresponding to a maximum inputtable power/current that can be inputted into the battery;
    a target point calculating section configured to calculate a point located between a maximum inputtable value point, existing on the internal resistance line and corresponding to the maximum inputtable value, and a currently-inputted value point, existing on the internal resistance line and corresponding to a charging power/current currently inputted to the battery, as a target point corresponding to a target charging power/current point; and an input value setting section configured to set, based on the calculated target point, the charging power or the charging current for charging the battery.

2. The charging control system as claimed in claim 1, wherein:
the battery is an assembled battery constructed by a plurality of battery cells;
the voltage detector is configured to detect a voltage of a specified cell of the plurality of battery cells, constructing the battery, and a total voltage of all the battery cells, as the voltage of the battery;
the upper-limit voltage calculating section is configured to calculate an upper-limit voltage of the specified cell;
the internal resistance line calculating section is configured to calculate a specified-cell internal resistance line indicating a relation between a value of a charging current of the specified cell and a value of a voltage of the specified cell, which voltage occurs when the charging, current has flown into the specified cell, and a total battery-cell internal resistance line indicating a relation between a value of a charging current of the battery and a value of a voltage of the battery, which voltage occurs when the charging current has flown into the battery;
the maximum inputtable value calculating section is configured to calculate, based on the voltage of the specified cell, the upper-limit voltage of the specified cell, and the specified-cell internal resistance line, a specified-cell maximum inputtable power, which is an electric power that can be inputted into the specified cell, or a specified-cell maximum inputtable current, which is an electric current that can be inputted into the specified cell, and also configured to calculate, based on the calculated specified-cell maximum inputtable power or the calculated specified-cell maximum inputtable current, a total battery-cell maximum inputtable power, which is an electric power that can be inputted into the battery, or a total battery-cell maximum inputtable current, which is an electric current that can be inputted into the battery;
the target point calculating section is configured to calculate a point located between a total battery-cell maximum inputtable value point, existing on the total battery-cell internal resistance line and corresponding to the calculated total battery-cell maximum inputtable power/current, and a total battery-cell currently-inputted value point, existing on the total battery-cell internal resistance line and corresponding to the charging power/current currently inputted to the battery, as the target point corresponding to the target charging power/current point.

3. The charging control system as claimed in claim 2, wherein:
the specified cell is a highest-voltage cell having a highest terminal voltage of the plurality of cells, constructing the battery.

4. The charging control system as claimed in claim 1, wherein:
the target point calculating section is configured to calculate the target point as a point nearer the maximum inputtable value point, as the detected voltage of the battery becomes lower.

5. The charging control system as claimed in claim 1, which further comprises:
a temperature detector configured to detect a temperature of the battery,
wherein the target point calculating section is configured to calculate the target point as a point nearer the currently-inputted value point, as the detected temperature of the battery becomes lower.

6. The charging control system as claimed in claim 1, which further comprises:
an internal resistance detector configured to detect an internal resistance of the battery, wherein the target point calculating section is configured to calculate the target point as a point nearer the currently-inputted value point, as the detected internal resistance of the battery becomes higher.

7. The charging control system as claimed in claim 1, wherein:
the target point calculating section is configured to compare the voltage of the battery, detected by the voltage detector, with the upper-limit voltage of the battery, calculated by the upper-limit voltage calculating section, and further configured to set the target point to the maximum inputtable value point, when the voltage of the battery exceeds the upper-limit voltage of the battery.

* * * * *